United States Patent [19]

Maeda et al.

[11] Patent Number: 5,173,088
[45] Date of Patent: * Dec. 22, 1992

[54] PROCESS FOR PREPARING CRYSTALS OF ANHYDROUS SODIUM SULFIDE

[75] Inventors: Kannosuke Maeda, Ashiya; Yoshio Aoyama, Kyoto, both of Japan

[73] Assignee: Sankyo Kasei Co., Ltd., Osaka, Japan

[*] Notice: The portion of the term of this patent subsequent to Dec. 10, 2008 has been disclaimed.

[21] Appl. No.: 357,497

[22] Filed: May 26, 1989

[30] Foreign Application Priority Data

May 31, 1988 [JP] Japan .................. 63-134854
Dec. 6, 1988 [JP] Japan .................. 63-309263

[51] Int. Cl.$^5$ ............................... C01B 17/22
[52] U.S. Cl. ................... 23/295 R; 23/294 R; 23/304; 423/203; 423/566.2
[58] Field of Search .......... 423/561.1, 566.2, 511; 23/295, 304, 294 R; 34/15; 159/DIG. 5, DIG. 15, DIG. 16

[56] References Cited

U.S. PATENT DOCUMENTS

| | | | |
|---|---|---|---|
| 2,477,959 | 10/1944 | Brown | 159/DIG. 5 |
| 2,533,163 | 12/1948 | Copes | 23/134 |
| 3,235,329 | 2/1966 | Gancy | 423/425 |
| 3,992,159 | 11/1976 | Mitchell | 159/DIG. 5 |
| 4,039,617 | 8/1977 | Kuo | 423/786 |
| 4,179,493 | 12/1979 | Sadan et al. | 23/295 |
| 4,908,043 | 3/1990 | Maeda | 23/302 T |

OTHER PUBLICATIONS

Grant and Hackh's "Chemical Dictionary" 5th ed (1987) McGraw-Hill publishers pp. 25 and 479.
Chemical Abstracts, p. 1939, Abstract No. 5606(6), Columbus, Ohio, US; B. P. Ershov et al.: "Obtaining chemically pure sodium sulfide. Preliminary communications", & J. Chem. Ind. 16, No. 2, 48–50 (1939) *Abstract*.
Chemical Abstracts, vol. 78, No. 22, Jun. 4, 1973, p. 137, Abstract No. 138433k, Columbus, Ohio, US; & SU-A-363 658 (Institute of Metallurgy and Ore Beneficiation, Acadmey of Sciences, Kazakh S. S. R.) Dec. 25, 1972.
Chemical Abstracts, vol. 68, No. 24, 1968, p. 10483, Abstract No. 108432k, Columbus, Ohio, US; N. I. Kopylov: "Sodium sulfide–water system and thermal dehydration of Na2S.9H20", ZH. Neorg. Khim. 13(2), 529–32 (1968) *Abstract*.
J. Chem. Soc. Dalton Trans., No. 3, 1986, pp. 469–475; J. Y. Andersson et al.: "Mechanisms and Kinetics of the thermal decomposition of sodium sulphide pentahydrate under controlled water vapour pressure".

Primary Examiner—Gary P. Straub
Assistant Examiner—Timothy C. Vanoy
Attorney, Agent, or Firm—Armstrong & Kubovcik

[57] ABSTRACT

Disclosed is a process for preparing crystals of anhydrous sodium sulfide, the process being characterized in that the process comprises the steps of heating crystals of polyhydrate of sodium sulfide under a pressure of about 500 torr or less at a temperature varying not more than ±about 10° C. from the phase transition point between polyhydrate crystals and monohydrate crystals of sodium sulfide for about 2 hours or longer and further heating the monohydrate under atmospheric or reduced pressure at about 90° to about 200° C. for about 2 hours or longer.

5 Claims, 1 Drawing Sheet

PROCESS FOR PREPARING CRYSTALS OF ANHYDROUS SODIUM SULFIDE

The present invention relates to a process for preparing crystals of anhydrous sodium sulfide.

Commercial sodium sulfides currently available include crystalline sodium sulfides containing water of crystallization (such as $Na_2S.9H_2O$, $Na_2S.6H_2O$, $Na_2S.5.5H_2O$, $Na_2S.5H_2O$ and the like) prepared by cooling or concentrating an aqueous solution of sodium sulfide to cause precipitation; and water-containing sodium sulfides prepared by solidifying into pellets, flakes, chips or the like a hot aqueous solution of sodium sulfide having a concentration of about 60%; etc. However, these sodium sulfides, which have a water content of 30% or more, suffer the drawbacks of being significantly deliquescent and easily oxidizable. Furthermore, the chemical reaction using such sodium sulfide poses the problem that the water present in the sodium sulfide may induce the undesirable side reaction or may shift the direction of progress of reaction. With these problems, there is a demand for anhydrous sodium sulfides free of the foregoing defects.

Conventional processes for preparing anhydrous sodium sulfide by dehydration of hydrous sodium sulfide include, for example, those comprising dehydrating hydrated sodium sulfide under reduced pressure by heating at a temperature at which the hydrate is partially fused. However, fusion of hydrated sodium sulfide gives a highly viscous mass which firmly adheres to a reactor, becoming difficult to stir or withdraw.

Also known is a process comprising heating hydrated sodium sulfide ($Na_2S.9H_2O$) without stirring under reduced pressure and gradually elevating the temperature to 750° to 850° C. under specific conditions without melting to achieve forced dehydration (U.S. Pat. No. 2,533,163). Yet this process is not suitable for use because it requires heating at a high temperature. Moreover, the anhydrous sodium sulfide prepared by forced dehydration of hydrate in the process assumes the skeletal crystal form of $Na_2S$ retaining the original crystal form of hydrate, and is consequently great in specific surface area, deliquescent and readily oxidizable.

An object of the present invention is to provide a simplified process for preparing crystals of anhydrous sodium sulfide which are unlikely to deliquesce and to oxidize and are easy to handle.

Other objects and features of the invention will become apparent from the following description.

The present invention provides a process for preparing crystals of anhydrous sodium sulfide, the process being characterized in that the process comprises the steps of heating crystals of polyhydrate of sodium sulfide under a pressure of about 500 torr or less at a temperature varying not more than ± about 10° C. from the phase transition point between polyhydrate crystals and monohydrate crystals of sodium sulfide for about 2 hours or longer and further heating the monohydrate under atmospheric or reduced pressure at about 90° to about 200° C. for about 2 hours or longer.

In the process of the present invention, the crystals of polyhydrate of sodium sulfide used as a starting material are maintained under reduced pressure at a specific temperature of lower than the melting point for a specific time period, whereby the polyhydrate of sodium sulfide is caused to undergo phase transition into a monohydrate thereof ($Na_2S.H_2O$) in solid state without melting. The monohydrate is then heated at a specific temperature range to complete the phase transition in solid state, producing crystals of anhydrous sodium sulfide. The thus obtained crystals of anhydrous sodium sulfide are compact cubic-system crystals and are markedly unlikely to deliquesce and oxidize, hence significantly useful.

Examples of crystals of polyhydrates of sodium sulfides useful as the starting material in the invention are $Na_2S.6H_2O$, $Na_2S.5.5H_2O$, $Na_2S.5H_2O$ and the like. These crystals of polyhydrates of sodium sulfides are known and can be prepared by concentrating or cooling an aqueous solution of sodium sulfide.

When crystals of polyhydrate of sodium sulfide with a melting point at 97.5° C. are heated to achieve direct dehydration in conversion into anhydrous sodium sulfide, the crystals are made into a highly viscous melt, which strongly adheres to a reactor, becoming difficult to stir or withdraw. On the other hand, our research shows that tetragonal-system crystals of polyhydrate of sodium sulfide can undergo phase transition in solid state directly into cubic-system crystals of monohydrate thereof ($Na_2S.H_2O$) when maintained at a specific temperature lower than the melting point under reduced pressure of about 500 torr or less. The phase transition from polyhydrate to monohydrate in solid state is a phenomenon discovered by us for the first time.

At the first step in the process of the invention, the crystals of polyhydrate of sodium sulfide are maintained under a pressure of about 500 torr or less, preferably about 330 torr or less, more preferably about 10 to about 40 torr at a temperature varying not more than ± about 10° C., preferably ±2° C., from the phase transition point between polyhydrate crystals and monohydrate crystals to achieve phase transition into $Na_2S.H_2O$. In this step, the released water is removed as a vapor from the system. The transition reaction is completed in about 2 hours or longer, usually about 2 to about 6 hours, preferably about 4 to about 5 hours, desirably with stirring.

The phase transition point between polyhydrate crystals and monohydrate crystals refers herein to a temperature at which the polyhydrate crystals starts phase transition to monohydrate crystals. For example, the following temperatures are employed:

| (1) Transition point between $Na_2S.5H_2O$ and $Na_2S.H_2O$ | | | | | |
|---|---|---|---|---|---|
| Pressure (torr): | 20 | 80 | 200 | 330 | 500 |
| Temperature: | 75.5 | 76.5 | 78.5 | 82 | 85 |
| (2) Transition point between $Na_2S.5.5H_2O$ and $Na_2S.H_2O$ | | | | | |
| Pressure (torr): | 20 | 80 | 200 | 330 | 500 |
| Temperature: | 73 | 74 | 76 | 80 | 80.5 |
| (3) Transition point between $Na_2S.6H_2O$ and $Na_2S.H_2O$ | | | | | |
| Pressure (torr): | 20 | 80 | 200 | 330 | 500 |
| Temperature: | 71 | 72 | 74.5 | 78 | 80 |

In the phase transition under said conditions, the crystal lattice of polyhydrate crystals is rearranged to bring about a change of crystal structure, and cubic-system crystals of $Na_2S.H_2O$ are formed by nucleation and the ensuing growth.

The phase transition from polyhydrate crystals to monohydrate crystals proceeds in solid state without melting the polyhydrate. Since the sodium sulfide is not melted during the transition, the sodium sulfide is prevented from agglomerating into increased-size bodies and adhering to a reactor, and can be uniformly stirred with ease.

The Na$_2$S.H$_2$O thus obtained is heated at the second step, whereby the monohydrate is caused to undergo phase transition in solid state to an anhydride, forming crystals of anhydrous sodium sulfide. To obtain an anhydride, the monohydrate is heated under atmospheric or reduced pressure, preferably about 20 to about 500 torr, more preferably about 100±20 torr at a temperature of about 90 to about 200° C., preferably about 97.5 to about 160° C. for about 2 hours or longer, usually about 2 to about 6 hours, preferably about 4 to about 5 hours. It is preferred to carry out the reaction with stirring.

The monohydrate formed in the first step is heated at the second step and thereby is made to undergo phase transition into anhydrous sodium sulfide in solid state without melting.

The crystals of anhydrous sodium sulfide according to the invention are formed by the rearrangement of crystal structure during the phase transition. The thus obtained crystals are dense in crystal structure and are smaller in specific surface area and unlikelier to deliquesce or oxidize than the skeletal crystals produced by forced dehydration.

According to the process of the present invention, crystals of anhydrous sodium sulfide can be easily prepared from crystals of polyhydrate of sodium sulfide. The Na$_2$S thus formed is usable for various applications because of high purity, diminished tendencies to deliquesce and to oxidize and ease of handling. For example, the crystals of anhydrous sodium sulfide are advantageously usable in production of polyphenylene sulfide resin by reaction of sodium sulfide with p-dichlorobenzene and in production of dibenzyl disulfide useful as extreme pressure depressant by reaction of sodium sulfide with benzyl sulfide. Further, the crystals mixed with sulfur dye powder give readily dissolvable sulfur dye.

Figure 1:
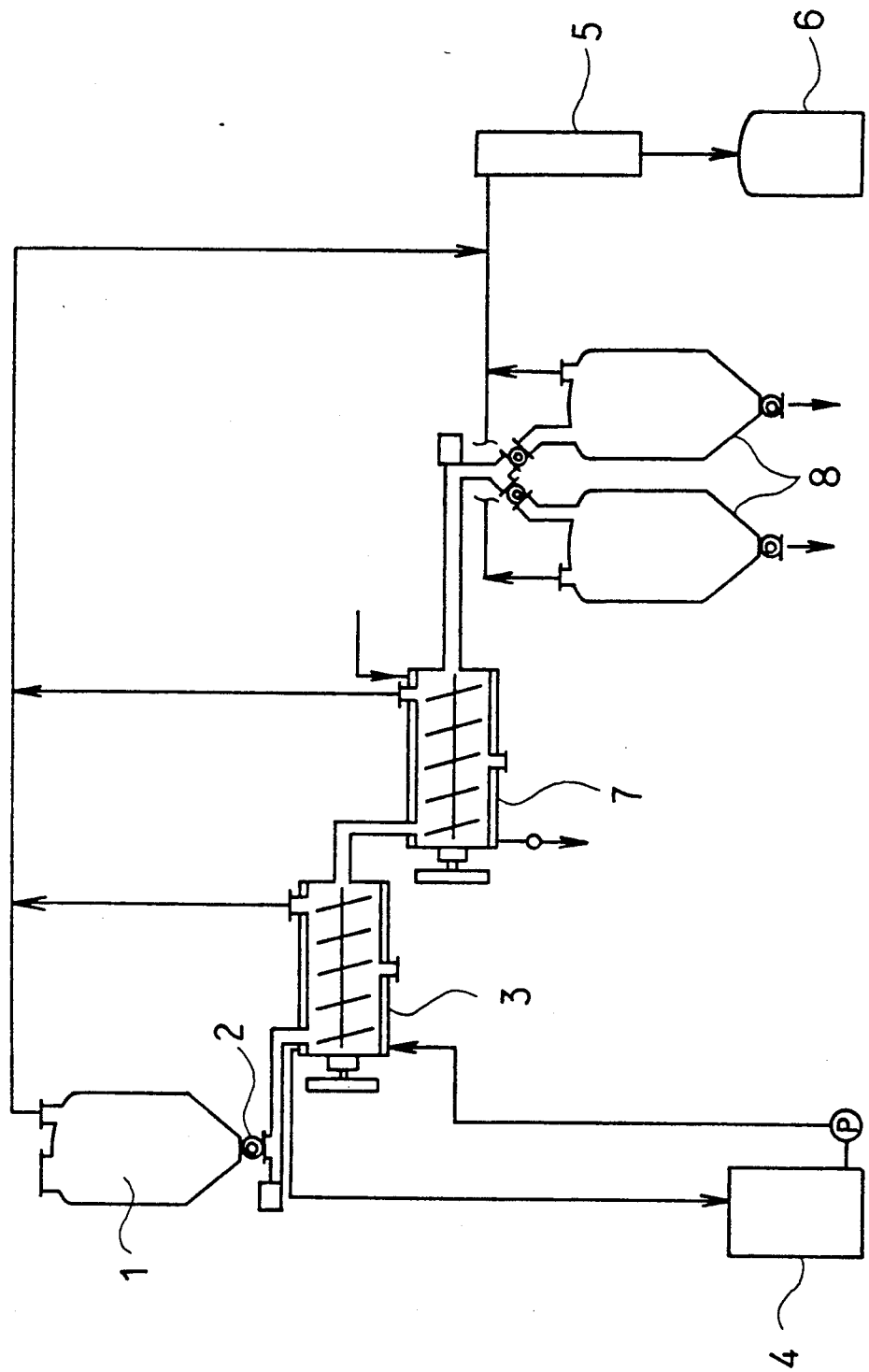
FIG. 1 is a flow chart showing the apparatus for producing crystals as used in Example 2.
1—measuring tank
2—valve
3—converter
4—water-heating bath
5—condenser
6—reservoir
7—converter
8—product container.

The present invention will be described below in more detail with reference to the following Examples.

EXAMPLE 1

A 210 g quantity of tetragonal-system crystals of Na$_2$S.5H$_2$O was placed into a rotary evaporator equipped with a 1 l-vol. converter. The pressure in the converter was adjusted to 19 to 20 torr by a vacuum pump. Then the crystals were heated at a temperature of 76° C. with stirring in an oil bath for 3.5 hours. The water vapor given off was condensed by a condenser and recovered. The crystals thus obtained were partially analyzed by X-ray diffraction. The analysis confirmed that the crystals had the crystal structure of Na$_2$S.H$_2$O (cubic-system crystals).

Subsequently the reaction product was rapidly heated to 100° C. and further heated with stirring to 115° C. over a period of 3 hours under a pressure of 100 torr, giving 97.7 g of reaction product and recovering 110 ml of separated water. The reaction product was found to contain 98.59% of crystals of anhydrous sodium sulfide and 0.002% of water.

EXAMPLE 2

Crystals of anhydrous sodium sulfide were prepared with use of an apparatus for producing crystals according to the flow chart shown in FIG. 1.

A 42 kg quantity of Na$_2$S.5H$_2$O was placed into a 50 l-vol. stainless steel measuring tank 1. A valve 2 was opened to admit the crystals into a 50 l-vol. stainless steel converter 3. The pressure in the converter 3 was adjusted to 20 torr. Water was heated to 90° C. in a 50 l-vol. stainless steel water-heating bath 4 and circulated around the converter 3 to heat the contents to 76° C. at which they were maintained with stirring for 5 hours. The water vapor given off was condensed by a condenser 5 and collected at a 50 l-vol. stainless steel reservoir 6.

The contents in the converter 3 were sent to a 50 l-vol. stainless steel converter 7 wherein they were heated to 115° C. with a vapor under a pressure of 100 torr and maintained at the same temperature with stirring for 5 hours. The emitted water vapor was condensed in the condenser 5 and collected at the reservoir 6. The reaction product in the converter 7 was fed into a product container 8 wherein 19.5 kg of product was produced. The product was subjected to X-ray diffraction, which confirmed that the product was cubic-system crystals of anhydrous sodium sulfide. The product was found to contain 97.9% of crystals of anhydrous sodium sulfide and 0.003% of water.

EXAMPLE 3

Tetragonal-system crystals of Na$_2$S.5H$_2$O (210 g) were charged into a rotary evaporator having a 1 l-vol. converter. The pressure in the converter was adjusted to 390 torr by a vacuum pump. The crystals were heated to a temperature of 82° C. with stirring for 3.5 hours in an oil bath. The water vapor given off was condensed by a condenser and recovered.

The resulting reaction product was rapidly heated to 100° C. and further heated to 145° C. with stirring over a period of 3 hours under a pressure of 300 torr, giving 97.5 g of reaction product and recovering 111 ml of separated water. The obtained reaction product was found to contain 98.20% of crystals of anhydrous sodium sulfide and 0.01% of water.

EXAMPLE 4

Tetragonal-system crystals of Na$_2$S.5H$_2$O (210 g) were charged into a rotary evaporator having a 1 l-vol. converter. The pressure in the converter was adjusted to 500 torr by a vacuum pump. The crystals were heated to a temperature of 83° C. with stirring for 3.5 hours in an oil bath. The water vapor given off was condensed by a condenser and recovered.

The resulting reaction product was rapidly heated to 100° C. and further heated to 160° C. with stirring over a period of 3 hours under a pressure of 400 torr, giving 97.5 g of reaction product and recovering 111 ml of separated water. The obtained reaction product was found to contain 98.75% of crystals of anhydrous sodium sulfide and 0.02% of water.

We claim:

1. A process for preparing crystals of anhydrous sodium sulfide, comprising the steps of heating crystals of polyhydrate of sodium sulfide in a solid state under a pressure of about 500 torr or less at a temperature varying not more than ± about 10° C. from the phase transition point between polyhydrate crystals and monohydrate crystals of sodium sulfide for about 2 hours or longer and further heating the monohydrate under atmospheric or reduced pressure at about 90° to about 200° C. for about 2 hours or longer.

2. A process according to claim 1 wherein the crystals of polyhydrate of sodium sulfide are $Na_2S.6H_2O$, $Na_2S.5.5H_2O$ or $Na_2S.5H_2O$.

3. A process according to claim 1 wherein the crystals of polyhydrate of sodium sulfide are heated under a pressure of about 330 torr or less.

4. A process according to claim 1 wherein the monohydrate of sodium sulfide is heated under a pressure of about 20 to about 500 torr.

5. A process according to claim 1 wherein the monohydrate of sodium sulfide is heated to a temperature of about 97.5° to about 160° C.

* * * * *